(12) United States Patent
Teoh et al.

(10) Patent No.: US 8,187,684 B2
(45) Date of Patent: May 29, 2012

(54) DOUBLE-DONNABLE GLOVE

(75) Inventors: Seng Chin Teoh, Penang (MY); Peter Wynne Williams, Penang (MY)

(73) Assignee: Regent Medical Limited, Iriam, Manchester (GB)

( * ) Notice: Subject to any disclaimer, the term of this patent is extended or adjusted under 35 U.S.C. 154(b) by 0 days.

(21) Appl. No.: 10/514,020

(22) PCT Filed: May 14, 2003

(86) PCT No.: PCT/GB03/02083
§ 371 (c)(1),
(2), (4) Date: Jul. 7, 2005

(87) PCT Pub. No.: WO03/095172
PCT Pub. Date: Nov. 20, 2003

(65) Prior Publication Data
US 2006/0010565 A1    Jan. 19, 2006

(30) Foreign Application Priority Data
May 14, 2002  (GB) .................................. 0211027.8

(51) Int. Cl.
*A41D 19/00* (2006.01)
(52) U.S. Cl. ................ 428/35.7; 2/159; 2/161.7; 2/168; 428/34.1
(58) Field of Classification Search ................ 428/35.7, 428/34.1; 2/159, 161.7, 168
See application file for complete search history.

(56) References Cited

U.S. PATENT DOCUMENTS

| | | | |
|---|---|---|---|
| 3,411,982 A * | 11/1968 | Kavalir et. al. | 428/493 |
| 4,102,844 A * | 7/1978 | Schwinum et al. | 524/745 |
| 5,084,514 A | 1/1992 | Szczechura et al. | |
| 5,881,387 A | 3/1999 | Merovitz et al. | |
| 6,000,061 A | 12/1999 | Taneja et al. | |
| 6,195,805 B1 | 3/2001 | Bourne et al. | |
| 6,254,947 B1 * | 7/2001 | Schaller | 428/36.8 |
| 6,329,444 B1 * | 12/2001 | McGlothlin et al. | 523/105 |
| 6,347,408 B1 | 2/2002 | Yeh | |
| 6,391,409 B1 * | 5/2002 | Yeh et al. | 428/35.7 |
| 2008/0306200 A1 * | 12/2008 | Chen et al. | 524/418 |

FOREIGN PATENT DOCUMENTS

| | | |
|---|---|---|
| CN | 1061517 A | 6/1992 |
| EP | 0486183 | 5/1992 |
| EP | 084325 | 6/1998 |
| EP | 0931633 | 7/1999 |
| GB | 2270618 | 3/1994 |
| GB | 2292384 | 2/1996 |
| WO | 9319704 | 10/1993 |
| WO | 9924507 | 5/1999 |
| WO | 0029478 | 5/2000 |
| WO | 0047070 | 8/2000 |
| WO | 0232475 | 4/2002 |

OTHER PUBLICATIONS

Database WPI; Section Ch, Week 198738, Derwent Publications Ltd., London, GB (Rubber Latex Goods), Feb. 7, 1987.
Database WPI, Section Ch, Week 197841, Derwent Publications Ltd., London, GB (Kuraray Co Ltd), Sep. 4, 1978.
"STN Chemical Abstract"; STN Chemical Abstract, XP002126734.

* cited by examiner

*Primary Examiner* — Brent Ohern
(74) *Attorney, Agent, or Firm* — Novak Druce + Quigg LLP

(57) ABSTRACT

A polychloroprene article comprises a polymer which is more readily chlorinatable that polychloroprene. A method of making the article comprises forming the article from an aqueous dispersion or solution of polychloroprene, characterized in that one or more polymers which are more readily chlorinatable than polychloroprene are included in said dispersion or solution. Preferably, the article is a polychloroprene glove containing carboxylated nitrile rubber, carboxylated styrene butadiene or polyisoprene.

1 Claim, No Drawings

DOUBLE-DONNABLE GLOVE

This application is a §371 U.S. National Stage Application of International Application No. PCT/GB03/02083, filed on May 14, 2003, claiming the priority of Great Britain Application No. 0211027.8, filed May 14, 2002, the entire disclosures of which are incorporated herein by reference in their entireties.

This invention relates to polychloroprene articles and more particularly, but not exclusively, to polychloroprene surgical gloves.

It is becoming increasingly common for medical practitioners generally, and surgeons in particular, to wear a second pair of rubber gloves over a first pair (i.e. to double-don) because of increasing fears about the risk of infection during medical examination and surgery. The wearing of two pairs of gloves provides an added margin of safety. However, whilst certain types of rubber glove can be double-donned fairly easily, others are difficult if not impossible to double-don because of the high degree of friction between the surfaces of the gloves. It is known to reduce this friction in a number of ways, for example a lubricating powder can be used on powdered gloves, or for powder-free gloves the surfaces can be chlorinated. Thus, when natural rubber or nitrile rubber gloves are chlorinated, the friction is reduced and the chlorinated gloves can be much more easily double-donned. However, gloves made from certain other rubbers, e.g. polychloroprene, are not readily susceptible to chlorination. In order to make any significant reduction in the frictional properties of a polychloroprene surface, it is necessary to use very high chlorine strengths, for example, more than 2000 ppm available chlorine, to the extent that the polychloroprene article may well thereby be rendered unsuitable for its intended purpose. In addition, there are serious in-process difficulties in trying to chlorinate polychloroprene surgical gloves, mainly arising from the development of tackiness during processing.

We have now devised a way whereby polychloroprene gloves can be made with a reduced surface friction so that they can be more readily double-donned.

In accordance with a feature of the present invention, polychloroprene articles such as gloves are made containing a minor amount of another synthetic polymer which is more readily chlorinatable, and the gloves so formed are chlorinated.

In its broadest aspect, therefore, the invention provides a polychloroprene article comprising a polymer which is more readily chlorinatable than polychloroprene.

In a further aspect, the invention provides a method of making a polychloroprene article such as a glove having a readily chlorinatable surface, which method comprises forming said article from an aqueous dispersion or solution of polychloroprene, suitably by dipping a former into said suspension or solution, characterised in that one or more polymers which are more readily chlorinatable than polychloroprene are included in said dispersion or solution. The article so formed can then be chlorinated.

In a yet further aspect, there is also provided a method of making a double-donnable polychloroprene article, especially a glove, by employing a method according to the invention.

Chlorination is the reaction of chemical functionalities on the surface of the latex with chlorine. Typically, reaction is via unsaturation in the polymer chain but the chemistry is very complex. Whilst there are methods for the measurement of surface chlorination, these methods are difficult to carry out and the results are generally not reproducible. It has been found that a subjective measurement of surface friction or surface drag (as described in Example 2) gives a reliable result that is accepted by the end-user. The overall physical effects of chlorination are a hardening of the outer surface and the formation of superficial sub-micron cracking which leads to roughening of the surface. These give rise to improved (lowered) surface friction.

By the term "more readily chlorinatable" we mean polymers having functionalities which, in the chemical environment of the polymer, are more reactive towards chlorine than those in polychloroprene. Generally speaking, this will be related to the chemical environment of the C=C unsaturation in the polymer backbone. Thus, suitable polymers include those having unsaturated groups, particularly C=C groups, which are more reactive to chlorine than the corresponding groups in polychloroprene.

The presence of the elastomeric polymer(s) in the polychloroprene effectively renders the product chlorinatable by standard chlorination procedures so that the chlorinated surfaces have a reduced friction. The chlorination process can be carried out with chlorine gas in water, or acidified sodium hypochlorite or using a chlorine donor agent, all at concentrations of from 200-1000 ppm available chlorine. The level will depend upon the surface slip required. The preferred available chlorine concentration is 400-600 ppm for good slip and double-donning properties. For gloves, the surfaces should have good slip properties, i.e. the outside surface tackiness of the article is reduced by the chlorination such that the finished gloves can be double-donned more readily.

By way of example, "standard" conditions are that each glove to be treated is washed with about 150 ml of solution containing 400-600 ppm available chlorine for 20 minutes and then neutralised with sodium thiosulphate solution for 10 minutes, although the skilled person will understand that broadly equivalent treatments can also be used.

The present invention thus provides a way of making a polychloroprene glove such that it can be double-donned readily, without having to resort to pretreatment with very high chlorine strengths. The performance properties of polychloroprene gloves made according to the present method are therefore not impaired.

We prefer to make polychloroprene gloves by dipping a suitably shaped former into a compounded aqueous dispersion (i.e. latex) of polychloroprene, although solutions can be used if desired. Hereafter, the invention is described with reference to latices.

The elastomeric polymers to be added to the polychloroprene latex must themselves be materials which can be chlorinated under standard chlorination conditions. Preferably, they have a degree of incompatibility with the polychloroprene so that the added material tends to migrate to the surface of the polychloroprene film, thus leading to a higher concentration of readily chlorinatable polymer at the surface of the film. In this way, essentially a thin layer of chlorinatable material can be formed on the surface of the polychloroprene film. By "degree of incompatibility" we refer to polymers which are not fully miscible with polychloroprene at the molecular level, such that there is at least a degree of phase separation upon drying the film.

The added polymer or polymers can in principle be any polymer containing a suitable level of unsaturation in the polymer chain which is more readily chlorinatable than polychloroprene, and preferably which is chlorinatable under standard conditions. We prefer to use polymers such as carboxylated nitrile rubber, carboxylated styrene butadiene, and polyisoprene. Preferably these polymers are themselves in the form of a latex which is then added to the host latex.

For the best results, we have found that the added polymer should be used in a relatively small quantity. Preferably, an amount of 4 to 15% of polymer latex (by weight of the host latex) is added to the host latex. If more than about 15% is used, this tends to alter the properties of the film which is generally undesirable. Most preferably, between 5 and 10% (by weight of the host latex) of polymer latex is employed.

Where carboxylated nitrile latex is used as the added material, the polymer preferably contains (by weight) 3-6% carboxylic acid, 20-40% acrylonitrile and 60-80% butadiene. A particularly preferred grade includes 4% carboxylic acid, 26% acrylonitrile and 70% butadiene.

A particularly preferred material is carboxylated styrene butadiene (SBR) latex, since even when used at higher levels it has very little effect on the physical properties of a finished polychloroprene glove. Preferably, the polymer contains (by weight) 0-5% carboxylic acid, 40-60% styrene and 40-60% butadiene. Most preferably, the polymer is a carboxylated styrene-butadiene latex with styrene:butadiene in the ratio of 40:60. The preferred level of carboxylic acid is from 1-3% (by weight).

Another preferred material is synthetic cis-1,4-polyisoprene latex, and this can be employed in the quantities indicated generally above.

The processes of forming a shaped rubber article such as a glove by dipping into a compounded latex is well known in the art and will not be described further. Examples include Europrene 5583 from Enichem, which is a carboxylated styrene butadiene containing 40% (by wt) styrene; and Synthomer 6000 (from Synthomer), a carboxylated nitrile latex containing 20% (by wt) acrylonitrile.

In a preferred embodiment a polychloroprene glove is made by dipping into a polychloroprene latex containing carboxylated styrene butadiene. The internal surface of the glove is then coated with a hydrogel polymer material as, for example, disclosed in EP-A-105613, EP-A-198514 and EP 199318. Preferably the hydrogel polymer is a copolymer of 2-hydroxyethyl methacrylate (IEMA) with methacrylic acid (MAA) and/or with 2-ethylhexylacrylate (EHA) which are described in our European patent no. 105613. We prefer to use a copolymer comprising about 68 mol % HEMA, 14 mol % MAA, and 18 mol % EHA. The hydrogel polymer coating is preferably applied by dipping the coagulated polychloroprene glove into a dispersion of hydrogel polymer. Once the hydrogel polymer layer has been applied to the rubber, bonded and cured the glove is preferably tumbled in a surfactant solution. Preferred surfactants include those described in U.S. Pat. No. 3,813,695 (the "Podell patent"). The glove is then chlorinated under standard conditions. Chlorination can be done before any hydrogel polymer layer is applied or after the application of such a layer. Surprisingly, we have found that when chlorination is done after applying a hydrogel layer, the properties of the layer (which provide excellent dry- and damp-slip) are unaffected by chlorination. The chlorinated polychloroprene glove can then be readily double-donned over a second polychloroprene glove made in the same way.

In general, the compounded latex will comprise:

| Component | pphr | Preferred |
|---|---|---|
| Neoprene or Neoprene Copolymer containing chlorinatable polymer | 100 | 100 |
| Accelerators | 1.0-2.0 | 1.5 |
| Stabiliser | 0.6-1.2 | 0.9 |
| Vulcanising agent(s) | 4.0-18.0 | 12.0 |

-continued

| Component | pphr | Preferred |
|---|---|---|
| Pigment | 0.5-2.0 | 1.0 |
| Antioxidant | 1.0-3.0 | 1.0 |

Typically, the latex solids are 40-47% (by weight of composition), with a preferred range of 45-46%

In order that the present invention may be more fully understood, the following Examples are given by way of illustration only.

EXAMPLE 1

Comparative

A thin walled surgeons' glove was made as follows. A glove shaped former was dipped into a solution of calcium nitrate (SG 1.10-1.20) and then dried at 90°-110° C. for 20-30 seconds. The former was then dipped into a compounded latex containing Neoprene 750 (a copolymer of 2-chloro-1,3 butadiene and 2,3 dichloro-1,3-butadiene; total solids content (TSC)=40-46%), but not containing any additional chlorinatable polymer. The latex contained Rhenocure, DPG (diphenyl guanidine) and Zinc BuD (zinc dibutyl dithiocarbamate) as accelerators, sulphur and zinc oxide as vulcanising agents, Dehydol and Arylan as stabilisers, Wingstay L as antioxidant and Colanyl blue A2R as pigment, according to the preferred formulation given above.

The coated former was dried at about 100° C. for about 1 minute, then beaded followed by leaching in water at 55°-60° C. for about 3 minutes, then dried in air for about 20 seconds. The surface of the latex on the former was then primed by dipping into a solution of 0.9-1.1% hydrochloric acid, rinsed in water, then dried in a stream of hot air. The coated former was then dipped into a solution of Hydrocote A (a terpolymer consisting substantially of 68 mole % HEMA, 14 mole % MAA, 18 mole % EHA) in industrial methylated spirits (IMS), beaded and cured at 125°-145° C. for 25-30 minutes. The glove was then stripped from the former and washed in water, then washed in a solution containing 0.25% CPC, 0.075% silicone, and dried. It is then washed in 0.05% Darvan L (anti-tack agent) for 15-30 minutes. After washing in water, the glove was then dried at 90° C. for 120 minutes.

EXAMPLE 2

A surgeons' glove was made according to Example 1 except that the latex comprised Neoprene 750 containing 7.5% by weight of carboxylated SBR latex (i.e. Neoprene 750 and carboxylated SBR latex in the ratio 92.5:7.5). The carboxylated SBR latex was Europrene 5583 available from Enichem, and containing 40% (by weight) styrene. The washing step in anti-tack agent was also omitted, but the glove was chlorinated according to the following procedure.

a) The glove was washed in water and the water drained off.
b) The glove was tumbled in a solution containing 400-600 ppm available chlorine for about 20 minutes.
c) Sodium thiosulphate neutraliser was then added and the glove tumbled for a further 10 minutes. (Alternative neutralisers, such as sodium carbonate, can be used if desired.)
d) The glove was drained, then washed in water containing 0.1% Rexanol, drained, washed in water and finally drained and dried.

The effectiveness of the process was then determined by the measurement of the surface drag of the outer surface of the glove. This is a subjective test and is conducted in the following manner.

The tester washes their hands well with soap and water, then rinses off the soap and dries the hands. A glove to be evaluated is held at the bead area by one hand. The tester then lightly holds the glove with the thumb and forefinger of the other hand, and slides these fingers gently down the surface from the glove's wrist to one of the glove's fingertips. This action is repeated using each of the other three glove fingers.

The subjective surface drag is assessed at each step using the following scale, and with reference to reference samples for surface drag testing.

1.0 Very smooth 2.0 Fairly smooth 3.0 moderate drag 4.0 High drag and not sticky The glove made according to Example 2 had a surface drag rating of 1-2 whereas the standard Neoprene glove made with Neoprene 750 latex alone, according to Example 1, had a rating of about 3.0.

A rating of 1-2 gives a glove that can be readily double donned over a second polychloroprene glove made in the same way.

Further gloves were made according to Example 2 using the formulations given below. Each of these gloves were found to have a surface drag rating of 1 according to the test described in Example 2.

EXAMPLE 3

| Ingredient | pphr |
|---|---|
| Neoprene 750 | 100 |
| Latex stabiliser | 1.0 |
| Carboxylated SBR latex | 8.1 |
| Rubber Accelerator | 1.5 |
| Vulcanising agent | 12.0 |
| Antioxidant | 1.0 |
| Pigment | 1.0 |

EXAMPLE 4

| Ingredient | pphr |
|---|---|
| Neoprene 750 | 100 |
| Latex stabiliser | 1.0 |
| Carboxylated nitrile latex | 8.1 |
| Rubber accelerator | 1.5 |
| Vulcanising agent | 12.0 |
| Antioxidant | 1.0 |
| Pigment | 1.0 |

EXAMPLE 5

| Ingredient | pphr |
|---|---|
| Neoprene 750 | 100 |
| Latex stabiliser | 1.0 |
| cis-1,4-polyisoprene latex | 8.1 |
| Rubber accelerator | 1.5 |
| Vulcanising agent | 12.0 |
| Antioxidant | 1.0 |
| Pigment | 1.0 |

Gloves made according to Examples 2 to 5 give good slip on the outside surface of the article for good double donning.

The invention claimed is:

1. A double-donnable chlorinated polychloroprene article comprising polychloroprene and a polymer, wherein the polymer is selected from the group consisting of: carboxylated nitrile rubber comprising carboxylic acid, acrylonitrile and butadiene; carboxylated styrene butadiene; and polyisoprene;

wherein the polychloroprene article comprises, before chlorination of the article, between 3.4% to 17.2% by weight of the polymer and;

wherein the carboxylated nitrile rubber comprises, before chlorination of the article, (by weight) 3-6% carboxylic acid, 20-40% acrylonitrile, and 60-80% butadiene, and wherein the article is a glove comprising, on the internal, user-contacting surface thereof, a layer of hydrogel.

\* \* \* \* \*